United States Patent [19]

Zimmer

[11] 4,014,289

[45] Mar. 29, 1977

[54] DEVICE FOR TREATING A WEB

[76] Inventor: Johannes Zimmer, Ebentalerstrasse 133, A-9020 Klagenfurt, Austria

[22] Filed: Sept. 12, 1975

[21] Appl. No.: 612,742

[30] Foreign Application Priority Data

Sept. 12, 1974 Austria .............................. 7400/74

[52] U.S. Cl. .............................. 118/213; 101/119; 335/285; 335/295
[51] Int. Cl.² ........................................ B05C 17/04
[58] Field of Search .......... 118/406, 126, 620, 119, 118/121, 213, 122; 101/119–124, 382 MV, 126, 127.1, 128.1; 335/230, 234, 285, 295, 306; 269/8

[56] References Cited

UNITED STATES PATENTS

| | | | |
|---|---|---|---|
| 2,209,558 | 7/1940 | Bing et al. .......................... 335/295 |
| 2,376,150 | 5/1945 | Karasick ............................. 335/295 |
| 3,196,784 | 7/1965 | Kraft ............................. 118/100 X |
| 3,216,349 | 11/1965 | Kraft ................................. 101/123 |
| 3,428,867 | 2/1969 | Becker .......................... 335/285 X |
| 3,592,132 | 7/1971 | Weber ................................. 101/119 |
| 3,613,635 | 10/1971 | Brehm ............................... 118/406 |
| 3,783,344 | 1/1974 | Ono et al. ...................... 335/295 X |
| 3,919,973 | 11/1975 | Zimmer ............................. 118/406 |

FOREIGN PATENTS OR APPLICATIONS 478,667  11/1969  Switzerland ...................... 101/120

*Primary Examiner*—Morris Kaplan
*Attorney, Agent, or Firm*—Wenderoth, Lind & Ponack

[57] ABSTRACT

A web treatment element in the form of a roller is attracted to one side of a web by magnetic attraction from a magnetic element positioned on the opposite side of the web. The magnetic element includes a plurality of electromagnets and a switch connected thereto to reverse the polarity of at least a portion of the electromagnets to selectively alter the polarity alignment of the electromagnets.

2 Claims, 5 Drawing Figures

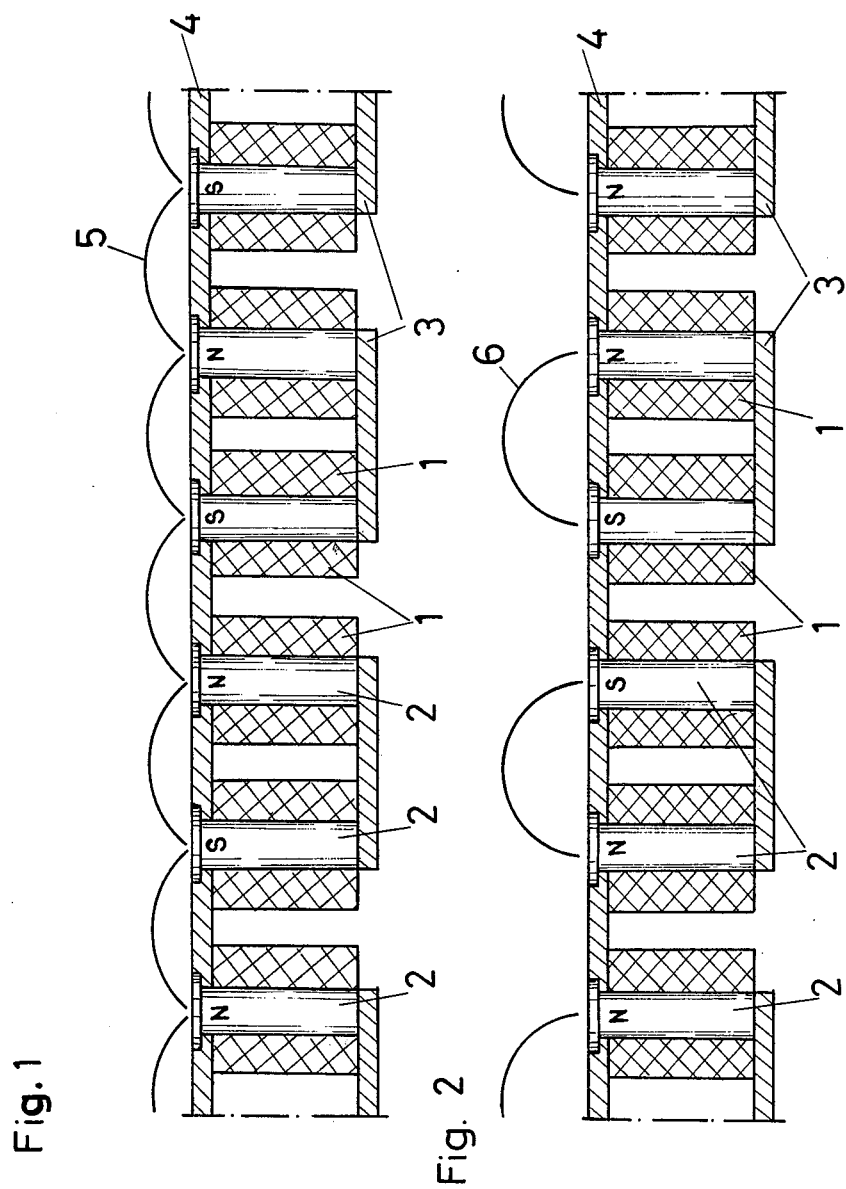

4,014,289

DEVICE FOR TREATING A WEB

BACKGROUND OF THE INVENTION

The invention relates to a device for treating one surface of a web by means of at least one roller-shaped working member, especially a roller squeegee, which is attracted by a magnetic element situated on the other side of the web and consisting substantially of a series of electromagnets arranged one after another in the longitudinal direction of the magnetic element. The present invention is particularly suitable for use in a screen stencil printing device.

The particular operating conditions of such devices require that steel rollers of different diameter be employed as the roller-shaped working members, e.g. roller squeegees. For example, if in a screen stencil printing device only a relatively small amount of material per unit of surface is to be applied to the surface of the web and a good sharpness of outline, e.g. of a printed pattern, is required, a small diameter roller squeegee may be satisfactorily employed. On the other hand, a larger diameter roller squeegee is necessary when a greater amount of coating material is to be applied to the web.

In known magnetic elements the coils are connected so as to produce an alternating north-south polarity of the magnet cores. Together with the two adjacent poles, each magnetic pole generates a magnetic field of force which has a strong lateral dispersion but the depth of which is not very strong. When the web to be worked is relatively thin and when the steel rollers employed as roller squeegees or other working elements possess a diameter of up to about 15 mm, a magnetic field of the type described is most suitable. On the other hand, if steel rollers of a larger diameter are to be used, or if the distance between the magnetic poles and the steel roller is relatively greater due to the thickness of the material, the attraction of the magnetic field is not sufficient for holding and maintaining the steel roller in the desired position.

SUMMARY OF THE INVENTION

The object of the present invention is to provide a magnetic element with which it is possible to generate different magnetic fields suitable for different particular operating conditions.

This object is achieved according to the present invention by providing that the direction of current can be reversed in at least a portion of the electromagnets of the magnetic element.

BRIEF DESCRIPTION OF THE DRAWINGS

The invention is explained in more detail below with reference to the accompanying drawings, wherein:

FIG. 1 is a transverse schematic cross section through a magnetic element arranged to have an ordinary polarity alignment;

FIG. 2 is a transverse cross section through the magnetic element, but having an altered polarity alignment;

DETAILED DESCRIPTION OF THE INVENTION

Figure 3:
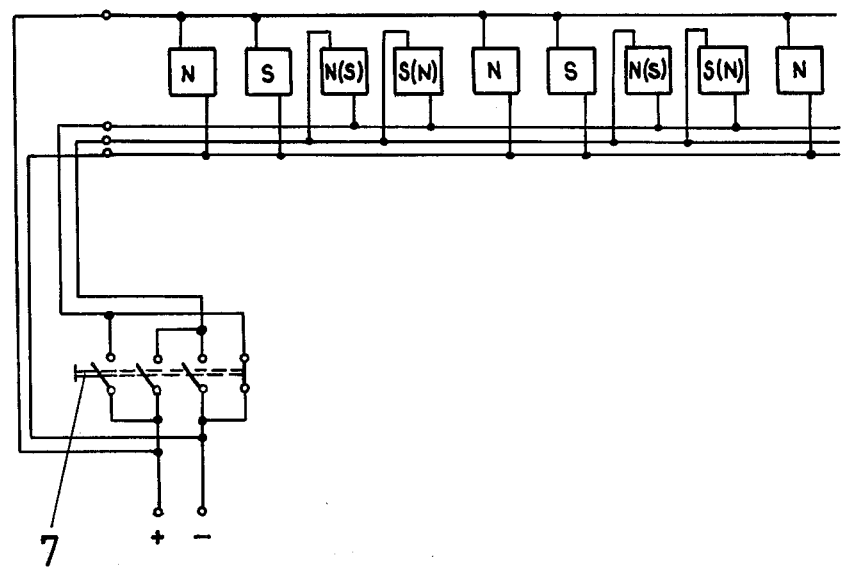
FIG. 3 is a schematic circuit diagram illustrating one possible manner of switching between the polarity alignments of FIGS. 1 and 2.

FIG. 1 schematically represents a magnet bar constructed with a known polarity alignment. The magnetic cores 2 are surrounded by coils 1 and are connected in pairs to back-circuit plates 3. The arrangement is closed toward the web carrying blanket by means of a cover plate 4. Magnet cores 2 end in recesses in cover plate 4 so as to form a series of spaced polar surfaces in the cover surface of the magnet bar.

According to FIG. 1, coils 1 are so connected that in the series of the polar surfaces of magnet cores 2 each two adjacent poles have a different polarity, i.e. there is formed an alternating polarity alignment, e.g. north-south-north-south, etc. Together with two adjacent poles, each pole produces a magnetic field 5 which has a strong lateral dispersion but which does not have a high or strong depth effect.

However, if the connections of coils 1 are changed to the arrangement shown in FIG. 2, so that a polarity alignment of north-north-south-south, etc. is formed in place of the alternating north-south polarity alignment of the magnet cores of FIG. 1, it is possible to obtain a substantially stronger concentration of the magnetic field and an intensified depth effect thereof. That is, due to the juxtaposed arrangement of two poles of the same sign, each magnet core forms a magnetic field 6 with only one adjacent core.

Thus, at an identical expenditure of energy, sufficiently strong attraction forces are obtained for roller squeegees having a diameter greater than about 15 mm and for distances between the roller squeegee and magnet cores necessary for treatment of relatively thick webs, e.g. carpets. Accordingly, by arranging the coils so that they may be connected according to choice in an alternating north-south polarity alignment or in a north-north-south-south polarity alignment, it is easily possible to adapt to the specific operating requirements with a single magnet bar.

FIG. 3 shows one possible circuit, which would be understood by those skilled in the art, for changing the polarity alignment in the manner mentioned above by means of a change-over switch 7.

Figure 4:
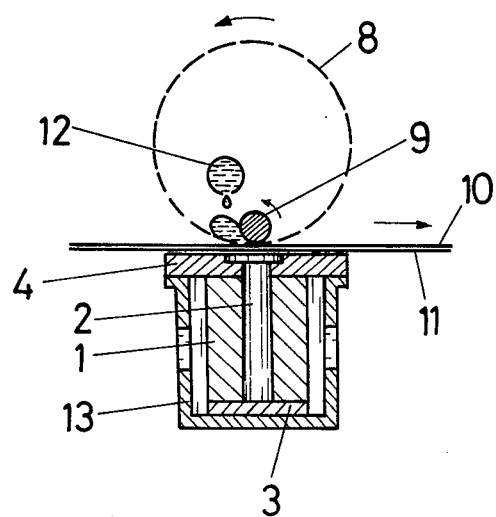
FIG. 4 is a cross section through one station of a rotary screen stencil printing machine incorporating the invention.

FIG. 4 illustrates the application of the device of the invention in a cylindrical screen stencil printing machine, and specifically shows a cross section through one station in such a printing machine. In the interior of a cylindrical screen stencil 8, rotatably mounted on the machine frame, there is positioned a roller squeegee 9 formed of magnetizable material. Beneath screen stencil 8 a web 10 to be printed is displaced in the direction of the arrow by means of a blanket 11 to which web 10 is glued, while screen stencil 8 and roller squeegee 9 rotate in the direction of the arrows associated therewith. An ink supply tube 12 extends into the interior of screen stencil 8 for the purpose of supplying the ink or other treatment material.

Roller squeegee 9 is magnetically attracted by the magnet bar arranged beneath blanket 11. Transverse to the direction of movement of web 10 the magnet bar possesses a structure as illustrated in FIGS. 1 and 2. That is, the magnet bar includes a series of coils 1 and magnet cores 2, the ends of magnet cores 2 which face web 10 or blanket 11 being contained in cover plate 4, while the ends of the magnet cores which are turned away from web 10 are connected in pairs to magnetic-flux back-circuit plates 3. The series of coils and magnet cores is preferably enclosed in a housing 13 provided with ventilation openings.

Figure 5:
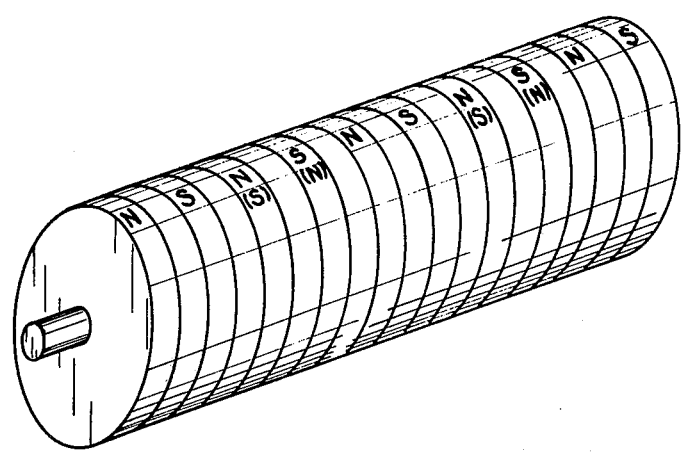
FIG. 5 is a perspective view of a magnetic element in the form of a magnetic roller in accordance with the invention.

The present invention is not however restricted to the above discussed illustrated specific structural arrangement. For example, the magnetic element need not necessarily consist of a magnet bar. Rather, there may also be employed a rotatably mounted, roller-shaped magnetic element, i.e. a magnet roller, the periphery of which possesses a series of annular polar surfaces that are axially spaced in relation to one another, and the polarity alignment of the poles of which are changeable in accordance with the invention, as shown in FIG. 5.

In addition to the above described application in the cylindrical screen stencil plate printing art, the present invention may also be applied to flat stencil printing devices including flat stencils, or more generally may be applied in any apparatus for treating a web of material by means of roller-shaped working elements, for example in lamination, coating, calendering, etc. operations.

Additional modifications to the above specifically described arrangements may be made without departing from the scope of the invention.

I claim:

1. In a device for treating a web of material, said device being of the type including at least one roller-shaped element formed of magnetically attractable material, said roller-shaped element being positioned on one side of a web of material to be treated and comprising means for applying a treating substance to said one side of said web of material, and a magnetic element positioned on the opposite side of said web of material, said magnetic element including a series of electromagnets arranged one after the other in a longitudinal direction of the magnetic element across the width of the web of material, said magnetic element comprising means for attracting said roller-shaped element and thereby forcing said roller-shaped element against one side of said web of material; the improvement comprising:

means connected to said electromagnets for selectively reversing the direction of current through the coils of at least a portion of said electromagnets to selectively change the polarity alignment of said electromagnets from a first polarity alignment of alternating polarity between adjacent said electromagnets and a second polarity alignment wherein two adjacent electromagnets are of the same polarity.

2. The improvement claimed in claim 1, wherein said current reversing means comprises a change-over switch connected to said coils of said at least a portion of said electromagnets.

* * * * *